United States Patent [19]

Brissette

[11] Patent Number: 4,580,996
[45] Date of Patent: * Apr. 8, 1986

[54] DRIVELINE APPARATUS

[75] Inventor: Ronald N. Brissette, Medina, Ohio

[73] Assignee: Rockwell International Corporation, Pittsburgh, Pa.

[*] Notice: The portion of the term of this patent subsequent to Jul. 17, 2001 has been disclaimed.

[21] Appl. No.: 513,945

[22] Filed: Jul. 15, 1983

[51] Int. Cl.[4] .................. F16J 15/32; F16D 3/06
[52] U.S. Cl. .................... 464/133; 277/12; 277/30; 277/152; 464/162
[58] Field of Search ............. 277/12, 30, 31, 32, 277/152, 153, 212 R, 212 F, 212 FB; 464/114, 133, 162, 172, 173

[56] References Cited

U.S. PATENT DOCUMENTS

| | | | |
|---|---|---|---|
| 1,536,986 | 5/1925 | Thiemer | 464/162 X |
| 2,116,290 | 5/1938 | Spicer | 464/162 |
| 2,199,926 | 5/1940 | Swennes | 464/162 X |
| 2,992,548 | 7/1961 | Walterscheid-Muller et al. | 464/162 |
| 3,400,558 | 9/1968 | Haines | 464/162 |
| 3,411,793 | 11/1968 | Jagger et al. | 277/32 |
| 4,020,651 | 5/1977 | Callies | 464/162 X |
| 4,033,020 | 7/1977 | Hudgens | 464/162 X |
| 4,153,260 | 5/1979 | Joyner | 464/162 X |
| 4,460,182 | 7/1984 | Brissette | 464/162 X |
| 4,460,183 | 7/1984 | Brissette | 464/162 X |

FOREIGN PATENT DOCUMENTS

| | | | |
|---|---|---|---|
| 2314770 | 11/1973 | Fed. Rep. of Germany | 464/173 |
| 86229 | 7/1981 | Japan | 464/162 |

Primary Examiner—Stuart S. Levy
Assistant Examiner—Daniel P. Stodola

[57] ABSTRACT

A driveline apparatus with a one piece sealing member to prevent loss and contamination of lubricant. The slip type assembly is generally of a sliding spline design. A yoke shaft is fitted into a slip yoke with an internal spline that generally mates with the external spline of the yoke shaft. Universal joint assemblies are attached to each yoke completing the assembly. The splined cavity within the slip yoke generally contains lubricants and is sealed by a plug and a seal which keeps the lubricants in and contaminants out. The sealing member is made of a resilient material and is of one piece construction. The sealing member has a cylindrical wall and integral radially inwardly extending circumferential annulus. The wall and annulus generally complement and mate with the cylindrical end of the slip yoke that has a groove on its surface to receive the annulus.

5 Claims, 8 Drawing Figures

DRIVELINE APPARATUS

FIELD OF INVENTION

This invention relates to a driveline apparatus and in particular a driveline apparatus with a one piece resilient sealing member.

BACKGROUND OF THE INVENTION

Driveline assemblies are a type of power take off assembly that transfers torque loads from a driving member to a driven member. The driveline assembly usually has a universal joint at each end. The typical cardan type universal joint is basically made up of two yokes each connected to a single center cross with four needle bearings. A fixed driveline assembly is used in applications where the required length of assembly does not vary such as power steering unit. A slip type or telescoping assembly is designed for applications in which the length of the assembly may vary during its normal operation because of application movement or function such as driveline connections between tandem drive axles for truck and tractor applications. Typical inter-axle slip type driveline assemblies can operate up to a 45° angle and can have length variations in excess of 12 inches.

The slip type assembly is generally of a sliding spline design. A yoke shaft is fitted into a slip yoke with an internal spline that generally mates with the external spline of the yoke shaft. Universal joint assemblies are attached to each yoke completing the assembly. The splined cavity within the slip yoke generally contains lubricants and is sealed by a plug and a seal which keeps the lubricants in and contaminants out.

The seal is generally one of two types: multi-component or one piece. With multiple-component seals, one or more split washers with internal splines are positioned over the end of the slip yoke and held in place by a threaded metal dust cap. The washer sets are usually of metal and cork or nylon and felt construction. With single piece construction, the dust cap is generally rubber with an internal thread that allows it to be screwed over the end of a slip yoke with matching external threads. The outer surface of the threaded portion of the seal is generally bonded to a metal band that helps maintain the overall seal geometry and prevents thread deformation.

In both arrangements there must be internal threads on the dust seal and corresponding external threads on the slip yoke. These threads on the slip yoke are susceptible to damage in handling and tight controls are required in processing.

SUMMARY OF THE INVENTION

The object of this invention is to provide a driveline apparatus with a one piece resilient sealing member.

This and other objects are disclosed in the preferred embodiment which has a first member with a generally circular cross section. The first member has a first end with a means for connecting it to the cross of a universal type joint and a second end having an opening into a cavity within the body of the first member. The cavity has an irregular inner surface. A second member has a first end portion, a central portion, and a second end portion. The first and central portions are slidably received into the cavity of the first member through the second end of the first member. The outer surface of the first end portion of the second member generally complements the irregular inner surface of the cavity of the first member. The central portion has a generally circular cross section with smooth surface. The second end of the second member has a means for connecting it to a cross of a universal type joint.

A resilient one piece sealing member has a means for mounting the sealing member at the second end of the first member. The sealing member has a central opening through which the first and central portions of the second member pass through and into the cavity of the first member. The central opening of the sealing member is in intimate contact with the surface of the central portion of the second member so that the intimate contact by the central opening combined with the means for mounting prevents loss or contamination of lubricant in the cavity of the first member.

The internal surface of the cavity in the first member is splined and the surface of the first end portion of the second member has a complementing external spline.

Preferably the one piece sealing member has a cylindrical wall, the inner diameter of which is the same as the outer diameter of the second end of the first member, a radially inwardly extending wall at one end of the cylindrical wall, a radially inwardly converging truncated conical wall joined to the inwardly extending wall, and a radially outwardly extending reinforcing rib joined at the inner end of the truncated conical wall.

In the preferred embodiment, the means for mounting the sealing member includes a radially inwardly extending circumferential annulus formed on the inner surface of the cylindrical wall of the sealing member and integral therewith. The annulus fits into and generally complements an annular groove near the edge of the second end of the first member.

A preferred driveline apparatus includes a first hollow tube-like member with an irregular internal surface and means for connecting a first end of the first member to a universal type joint. The first member also has a seal mounting end oppositely disposed from the first end. A circular shaft member with a first end portion whose surface generally complements a cavity formed by the internal surfaces of the first tube-like member is slidably received therein. A central portion of the shaft has a generally circular cross section and smooth external surface. A second end of the shaft has a means for connecting the second end to a universal type joint. A resilient one piece sealing member has means for mounting the sealing member at the seal mounting end of the first tube-like member. The sealing member has a central opening through which the first end portion and central portion of the shaft member pass through and into the first tube-like member. The central opening of the sealing member is in intimate contact with the smooth surface of the central portion of the shaft member so that the intimate contact by the central opening combined with the means for mounting prevents loss or contamination of lubricant within the first tube-like member. Preferably the internal surface of the first tube-like member is splined and the surface of the first end portion of the shaft member has a complementing external spline.

In the preferred driveline embodiment, the one piece sealing member has a cylindrical wall, the inner diameter of which is the same as the outer diameter of the seal mounting end of the first tube-like member, a radially inwardly extending wall at one end of the cylindrical wall, a radially inwardly projecting truncated conical wall joined to the inwardly extending wall, and a radially outwardly extending reinforcing rib joined at the inner end of the truncated conical wall.

Preferably, the means for mounting the sealing member at the seal mounting end of the first tube-like member includes a radially inwardly extending circumferential annulus formed on the inner surface of the cylindrical wall of the sealing member and is integral therewith. The annulus fits into and generally complements an annular groove located near the edge of the seal mounting end of the first tube-like member.

DESCRIPTION OF THE INVENTION

Figure 1:
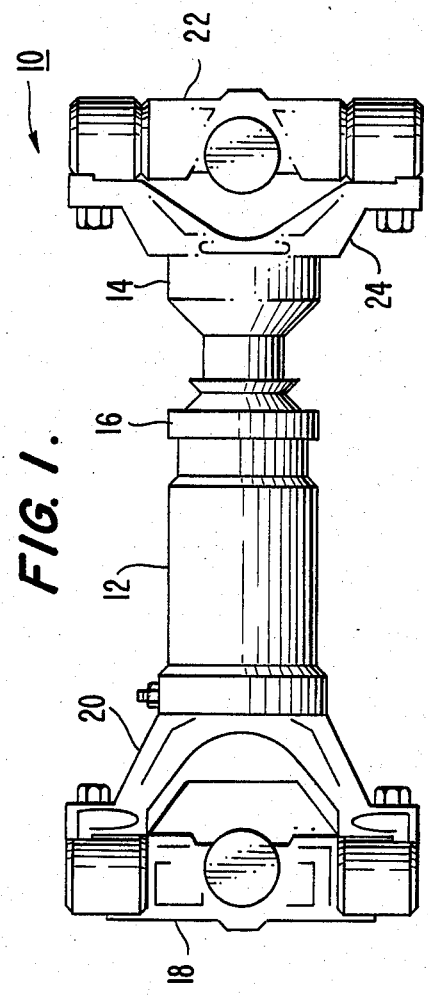
FIG. 1 is a plan view of an assembled driveline apparatus.
Figure 2:
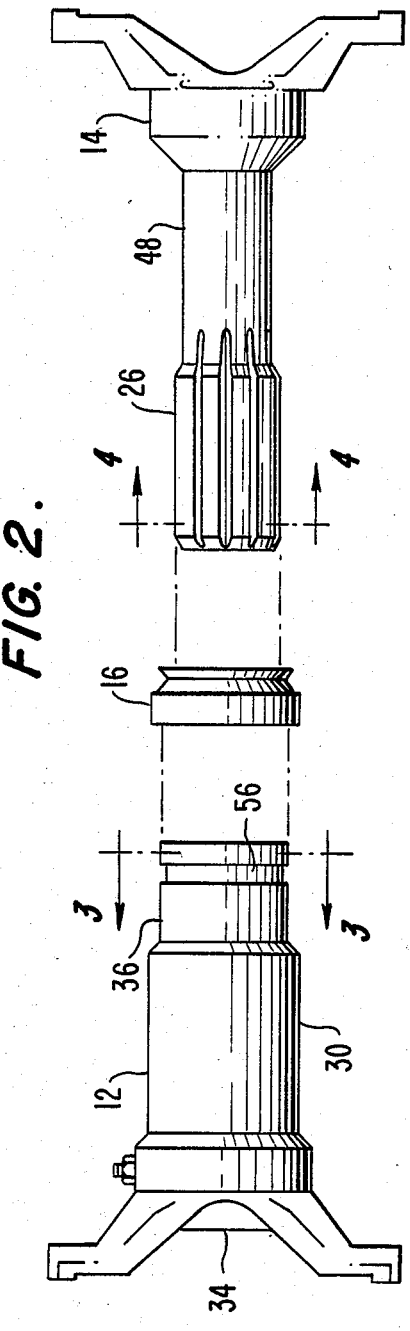
FIG. 2 is an exploded view of a driveline assembly without the universal joint cross section.
Figure 4:
FIG. 4 is an end view of the spline plug taken through line 4—4 of FIG. 2.
Figure 3:
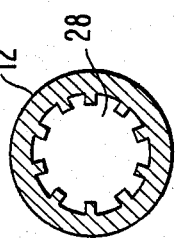
FIG. 3 is an end view of the slip yoke taken through line 3—3 of FIG. 2.
Figure 5:
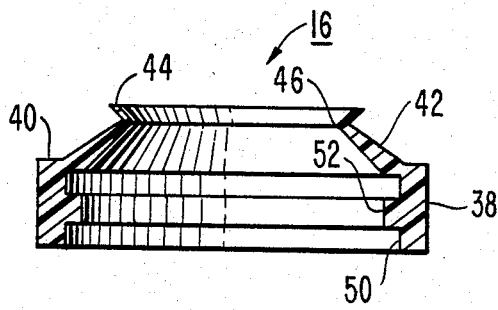
FIG. 5 is a cross section of the resilient sealing member.
Figure 7:
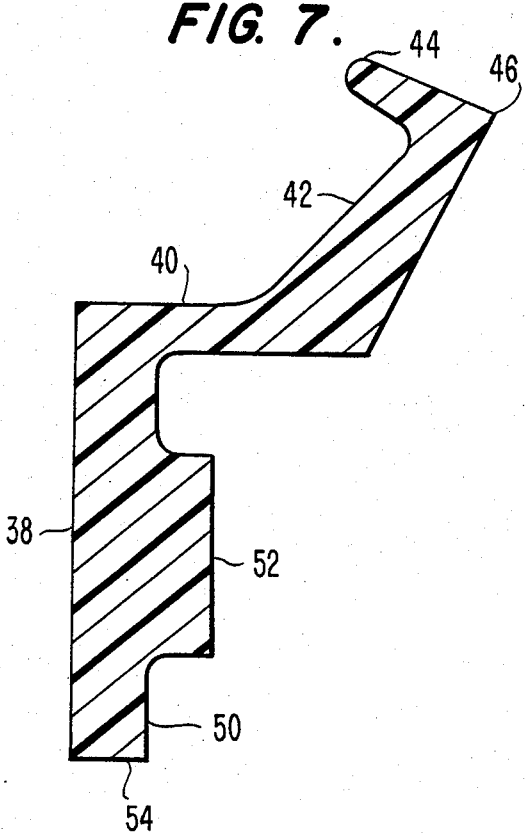
FIG. 7 is an enlarged cross section of the resilient sealing member's wall.
Figure 6:
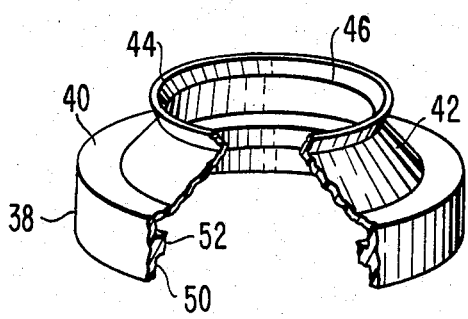
FIG. 6 is a cutaway isometric view of the resilient sealing member.
Figure 8:
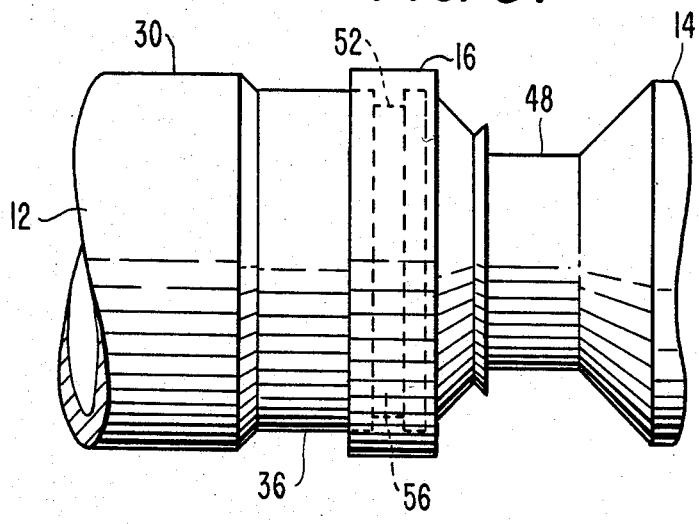
FIG. 8 is an enlargement of an assembled slip yoke, sealing member and yoke shaft.

The preferred driveline assembly 10 as shown in FIG. 1 consists generally of a slip yoke 12, a yoke shaft 14 and a one piece resilient sealing member 16. A cross and bearing kit 18 is bolted to yoke 20 of slip yoke 12 and a cross and bearing kit 22 is mounted to yoke 24 of the yoke shaft assembly 14. The splined end 26 of yoke shaft 14 is slidably received into the splined cavity 28 of the cylindrical body 30 of slip yoke 12. FIG. 3 shows the internal splined cavity 28 of slip yoke 12 while FIG. 4 shows the corresponding external spline surface 32 of yoke shaft 14. Lubricant within splined cavity 28 helps the easy movement of yoke shaft 14 within slip yoke 12. The lubricant is contained within splined cavity 28 by a plug 34 and one piece sealing member 16. Sealing member 16 fits over the seal mounting end 36 of the cylindrical body 30 of slip yoke 12 and allows yoke shaft 14 to slide therethrough.

The preferred one piece sealing member 16 is made out of a resilient material, usually neoprene rubber, with a durameter hardness of 60 to 70 and a minimum tensile strength of 2000 psi (140 kg/cm$^2$). The preferred line call-out designation for sealing member 16, as defined in the 1977 *Society of Automotive Engineers Handbook*, "Classification System for Electrometric Materials for Automotive Applications - SAE J200h" is 2BC620A14B14C12E014E034F17G21. Sealing member 16 has a cylindrical wall 38 joined to a radially inwardly extending wall 40. Wall 40 in turn is joined to a radially inwardly converging truncated conical wall 42. Truncated conical wall 42 is tapered to give it additional strength and terminates at a radially outwardly extending reinforcing rib 44. The diameter of the opening formed by edge intersection 46 between truncated conical wall 42 and reinforcing rib 44 is slightly less than the diameter of the unsplined section 48 of yoke shaft 14. The resulting close contact between edge 46 and unsplined section 48 of the yoke shaft 14 will generally prevent lubricant from leaking out of the splined cavity 28 in slip yoke 12 and prevent dust from entering.

The inner surface 50 of the cylindrical wall 38 of sealing member 16 has a circumferential annulus 52 that is formed integrally therewith. Annulus 52 is generally centered on inner suface 50 between radially outwardly extending wall 40 and the outer edge 54 of the cylindrical wall 38, although its position can vary along cylindrical wall 38. The inner diameter of cylindrical wall 38 is generally the same as the outer diameter of the seal mounting end 36 of slip yoke 12.

A circumferential groove 56 is cut in cylindrical body 30 of slip yoke 12 at seal mounting end 36. The diameter of the seal mounting end 36 taken at groove 56 is generally equal to the inner diameter of circumferential annulus 52. In addition, the width of the circumferential annulus 52 is generally the same as that of circumferential groove 56. When assembled, the inner surface 50 of sealing member 16 along cylindrical wall 38 generally complements the outside surface 58 of slip yoke 12 at seal mounting end 36. Since circumferential annulus 52 is fitted within circumferential groove 56, the resilient sealing member 16 is prevented from moving axially relative to slip yoke 12, and the lubricant is contained within splined cavity 28.

While the preferred embodiment of the invention has been illustrated and described herein, variations will become apparent to one of ordinary skill in the art. Accordingly, the invention is not to be limited to the specific embodiment illustrated and described herein and the true scope and spirit of the invention are to be determined by reference to the amended claims.

I claim:

1. A slip-type driveline assembly comprising:
a first member with a generally circular cross-section, said first member having a first end with means for connecting it to a cross of a universal type joint and a second end having an opening into a cavity within the body of said first member, said cavity having a splined inner surface;
a second member having a first end portion, a central portion, and a second end portion, said first and central portions being slidably received into said cavity of said first member through the second end of said first member, the outer surface of said first end portion of said second member being splined and complementing the splined inner surface of said cavity of said first member, said central portion having a generally circular cross section with smooth surface, and said second end of said second member having means for connecting it to a cross of a universal type joint; and
a resilient one-piece sealing member including:
 (a) a cylindrical wall;
 (b) a radially inwardly extending wall at one end of said cylindrical wall;
 (c) a radially inwardly converging truncated conical wall joined to said inwardly extending wall;
 (d) a radially outwardly extending reinforcing rib joined at the outer end of said truncated conical wall wherein the edge formed by the inner section of said reinforcing rib and said truncated conical wall defines a circular opening the diameter of which is slightly less than the central portion of the second member; and
 (e) means for mounting said sealing member on the second end of said first member including a radially inwardly extending circumferential annulus formed on the inner surface of said cylindrical wall of said sealing member and integral therewith, an annular groove formed near the edge of the second end of said first member, and wherein said annulus fits into and generally complements the annular groove.

2. The driveline assembly of claim 1 wherein said circumferential annulus is generally centered on the inner surface of said cylindrical wall.

3. The driveline assembly of claim 1 wherein said sealing member is made of resilient material.

4. The driveline assembly of claim 1 wherein the thickness of said truncated conical wall varies from its juncture with said radially inwardly extending wall to its juncture with said reinforcing rib.

5. The driveline assembly of claim 4 wherein the thickness of said truncated conical wall decreases from its juncture with said radially inwardly extending wall to its juncture with said reinforcing rib.

* * * * *